United States Patent [19]
Isobe

[11] Patent Number: 5,506,694
[45] Date of Patent: Apr. 9, 1996

[54] SCANNER-EQUIPPED ELECTROPHOTOGRAPHIC PRINTING MACHINE

[75] Inventor: Minoru Isobe, Tokyo, Japan

[73] Assignee: Oki Electric Industry Co., Ltd., Tokyo, Japan

[21] Appl. No.: 224,845

[22] Filed: Apr. 7, 1994

[30] Foreign Application Priority Data

Apr. 9, 1993 [JP] Japan .................................. 5-083136

[51] Int. Cl.$^6$ .................................................. H04N 1/024
[52] U.S. Cl. .......................... 358/472; 358/471; 358/474; 358/482; 250/216
[58] Field of Search .................................. 358/471, 472, 358/474, 476, 480, 482, 503, 296, 300; 359/726, 732; 250/208.1, 216; 355/200, 228, 232, 233

[56] References Cited

U.S. PATENT DOCUMENTS

| | | | |
|---|---|---|---|
| 3,914,546 | 10/1975 | Hamaker et al. | 358/472 |
| 4,424,524 | 1/1984 | Daniele | 358/472 |
| 5,327,263 | 7/1994 | Katagiri et al. | 358/471 |

FOREIGN PATENT DOCUMENTS 59-12699  1/1984  Japan .

*Primary Examiner*—Edward L. Coles, Sr.
*Assistant Examiner*—Thomas D. Lee
*Attorney, Agent, or Firm*—Panitch Schwarze Jacobs & Nadel

[57] ABSTRACT

Upon writing, a portion of light emitted from light-emitting devices of a light-emitting and light-receiving head 2 is deflected by a half mirror and is then allowed to pass through a first lens array to achieve optical writing on a rotating or moving photoreceptor. Upon reading, on the other hand, light reflected by an original is allowed to pass through a second lens array and then to enter the half mirror. The light is then allowed to pass through the half mirror to the light-emitting and light-receiving head 2 and is hence read by reading devices of the light-emitting and light-receiving head.

It is therefore possible to perform writing and reading while the light-emitting and light-receiving head and the optical system remain stationary. No mechanism is therefore needed for moving the light-emitting and light-receiving head, thereby making it possible to provide a scanner-equipped electrophotographic printing machine having small dimensions and high resolution.

26 Claims, 4 Drawing Sheets

SCANNER-EQUIPPED ELECTROPHOTOGRAPHIC PRINTING MACHINE

BACKGROUND OF THE INVENTION a) Field of the Invention

This invention relates to a scanner-equipped electrophotographic printing machine having a light-emitting and light-receiving head which can perform optical writing on a photoreceptor by an array of light-emitting devices and also reading of an original by an array of light-receiving devices.

b) Description of the Related Art

A scanner-equipped electrophotographic printing machine having a light-emitting and light-receiving head, which can perform optical writing on a photoreceptor by an array of light-emitting devices and also reading of an original by an array of light-receiving devices, has the merit that its optical path becomes shorter compared with a scanner-equipped electrophotographic printing machine making use of a semi-conductor laser. Further, the scanner-equipped electrophotographic printing machine having the light-emitting and light-receiving head also has the merit that no expensive optical system is required and a dimensional reduction is possible. Owing to these merits, a variety of systems have been proposed to date with respect to scanner-equipped electrophotographic printing machines having a light-emitting and light-receiving head.

For example, there is the technique disclosed in Japanese Patent Application Laid-Open (Kokai) No. SHO 59-12669. According to this technique, a single LED array (an array of light emitting diodes) is commonly used for both writing/reading and illumination of an original. Moreover, it also employs a head assembly constructed of an integral unit of the LED array and a "SELFOC LENS" (trade mark; manufactured by Nippon Sheet Glass Co., Ltd.). Upon writing, the integral head assembly is rotated to a side of a photoreceptor and the LED array is caused to emit light to perform writing. Upon reading, on the other hand, the integral head assembly is rotated to a side of an original and the LED array is caused to emit light to perform reading of the original while illuminating it.

The technique, which is disclosed in Japanese Patent Application Laid-Open (Kokai) No. SHO 59-12669 referred to above, however has adopted the construction that the head assembly is rotated considerably. An extra space is therefore needed for permitting rotation of the head assembly. This extra space has remained as an obstacle for achieving a dimensional reduction.

Further, a play is indispensable between the head assembly and an associated shaft, about which the head assembly is allowed to rotate, in order to permit smooth rotation of the head assembly. The distance between the photoreceptor and the head assembly however varies due to deformation, wearing and/or vibrations of the shaft. In the case of an electrophotographic printing machine designed to conduct high-density (for example, 600 DPI) printing, the above-mentioned variations result in misregistration or misalignment and blurring of printed dots so that the shaft has remained as a cause for impaired vividness of a picture.

SUMMARY OF THE INVENTION

An object of the present invention is to achieve writing on a drum-shaped photoreceptor while maintaining stationary a light-emitting and light-receiving head and an optical system and also to achieve reading of an original while maintaining stationary the light-emitting and light-receiving head and the optical system which are the same as those employed for writing. In other words, an object of the present invention is to reduce the size of a scanner-equipped electrophotographic printing machine by eliminating the space which has heretofore been required to move the light-emitting and light-receiving head and the optical system.

Another object of the present invention is to achieve a vivid picture by using the light-emitting and light-receiving head and the optical system in a stationary manner and hence eliminating misregistration or misalignment and blurring of printed dots.

To achieve at least one of the above objects, the present invention provides a scanner-equipped electrophotographic printing machine comprising:

a light-emitting and light-receiving unit for selectively emitting light to perform writing or receiving light transmitted via an original on which information to be read is written;

writing means to which the light emitted by said light-emitting and light-receiving unit is guided to write on a printing medium information of the light emitted by said light-emitting and light-receiving unit;

first means for guiding the light, which has been emitted by said light-emitting and light-receiving unit, to said writing means and also the light, which has been transmitted via the information to be read, to said light-emitting and light-receiving unit; and second means for focusing the light, which has been emitted by said light-emitting and light-receiving unit, onto said writing means and also the light, which has been transmitted via the original, onto said light-emitting and light-receiving unit.

The scanner-equipped electrophotographic printing machine according to the present invention has the advantage that writing and reading can be performed while maintaining stationary the light-emitting and light-receiving head and the optical system. Owing to the use of the light-emitting and light-receiving head and the optical system in a stationary manner, no mechanism is needed for moving the light-emitting and light-receiving head and the optical system. This has made it possible to eliminate such an extra space as mentioned above and hence to achieve a dimensional reduction. The scanner-equipped electrophotographic printing machine according to the present invention can therefore be provided as a scanner-equipped electrophotographic printing machine having small dimensions and high resolution.

DESCRIPTION OF THE PREFERRED EMBODIMENTS

Figure 1:
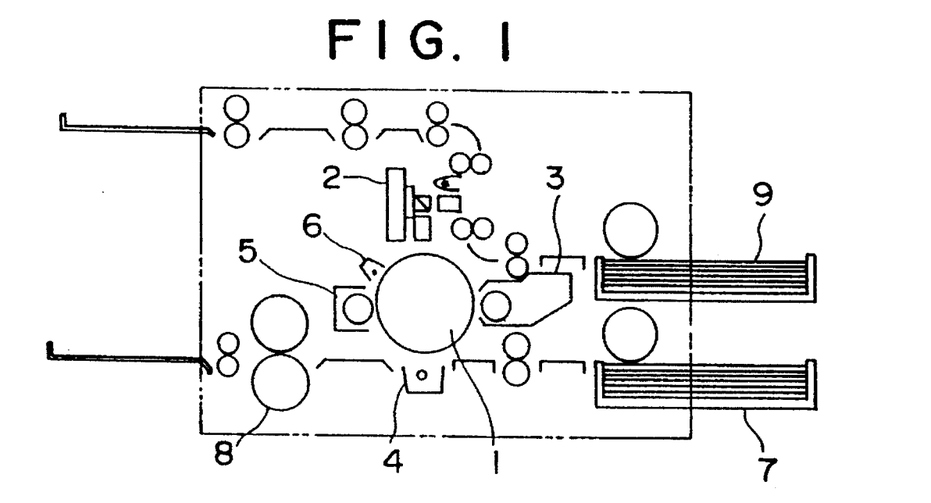
FIG. 1 is a simplified side view of a scanner-equipped electrophotographic printing machine according to a first embodiment of the present invention.
Figure 2:
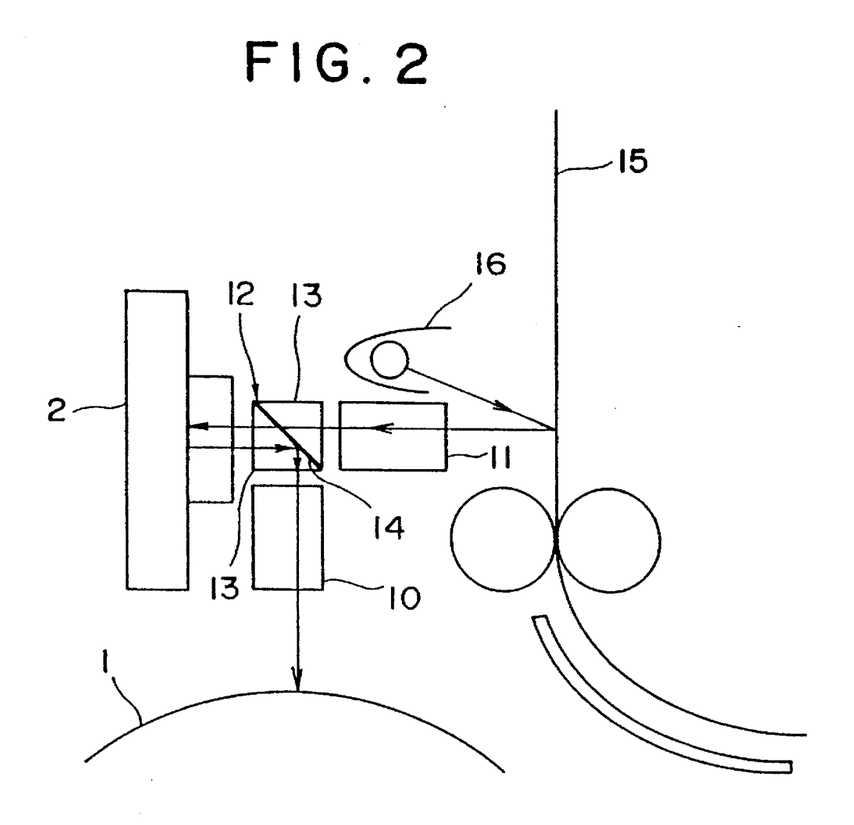
FIG. 2 is an enlarged, simplified fragmentary side view of the scanner-equipped electrophotographic printing machine according to the first embodiment.

Referring first to FIGS. 1 and 2, the scanner-equipped electrophotographic printing machine according to the first embodiment is internally provided with a drum-shaped photoreceptor 1, a light-emitting and light-receiving head 2, a developer mechanism 3, a transfer charger 4, a cleaning unit 5, a primary charger 6, a fixing unit 8, a first lens array 10, a second lens array 11, a half mirror 12 and a fluorescent lamp 16.

In addition, the scanner-equipped electrophotographic printing machine is also provided with a paper tray in which printing paper sheets are stored and with an original tray in which originals to be read are stored.

The light-emitting and light-receiving head 2 has an array of light-emitting devices (hereinafter abbreviated as the "LED array") and an array of light-receiving devices (hereinafter abbreviated as the "LRD array"), which are formed integrally. The light-emitting and light-receiving head 2 is arranged in the proximity of the drum-shaped photoreceptor 1 so that a latent electrostatic image can be formed on a surface of the drum-shaped photoreceptor 1.

The developer mechanism 3 is disposed at a position close and opposite to the drum-shaped photoreceptor 1 in order to have toner attracted to an area corresponding to the latent electrostatic image formed on the surface of the drum-shaped photoreceptor 1.

The transfer charger 4 is arranged at a position close and opposite to the drum-shaped photoreceptor 1 so that the toner, which has been attracted on the area corresponding to the latent electrostatic image formed on the surface of the drum-shaped photoreceptor 1 by the developer mechanism 3, is transferred onto a printing paper sheet.

The cleaning unit 5 is arranged at a position close and opposite to the drum-shaped photoreceptor 1 in order to clean off any toner still remaining on the surface of the drum-shaped photoreceptor 1.

The primary charger 6 is disposed at a position close and opposite to the drum-shaped photoreceptor 1 in order to uniformly charge the surface of the drum-shaped photoreceptor 1.

The fixing unit 8 is arranged on a rearward side of the transfer charger 4 to heat under pressure the toner which has been transferred onto the printing paper sheet by the transfer charger 4, whereby the toner is fixed.

The paper tray 7 stores the printing paper sheets and is arranged on a forward side of the transfer charger 4.

The original tray 9 stores the originals whose characters, images or the like are to be read by the light-emitting and light-receiving head 2.

The first lens array 10 is arranged opposite to the drum-shaped photoreceptor 1 so that a focal point is formed on the surface of the drum-shaped photoreceptor 1.

The second lens array 11 is arranged opposite to a path along which the originals are successively transported from the original tray 9, so that light reflected by each original 15 is allowed to pass through the second lens array 11.

The half mirror 12 is formed of two triangular prisms 13 combined together to present a rectangular shape in cross-section. The half mirror 12 also includes a semitransparent film 14 held between the two triangular prisms 13. The half mirror 12 serves to deflect light, which has been emitted from the light-emitting and light-receiving head, toward the first lens array 10. The half mirror 12 also permits transmission therethrough of the light which has been reflected by the original and has then passed through the second lens array 11.

The fluorescent lamp 16 is arranged at such a position that each original 15 on the transportation path can be illuminated to read characters, patterns or the like written or otherwise formed on the original 15.

The control system of the scanner-equipped electrophotographic printing machine according to the first embodiment of the present invention will next be described with reference to FIG. 3.

Figure 3:
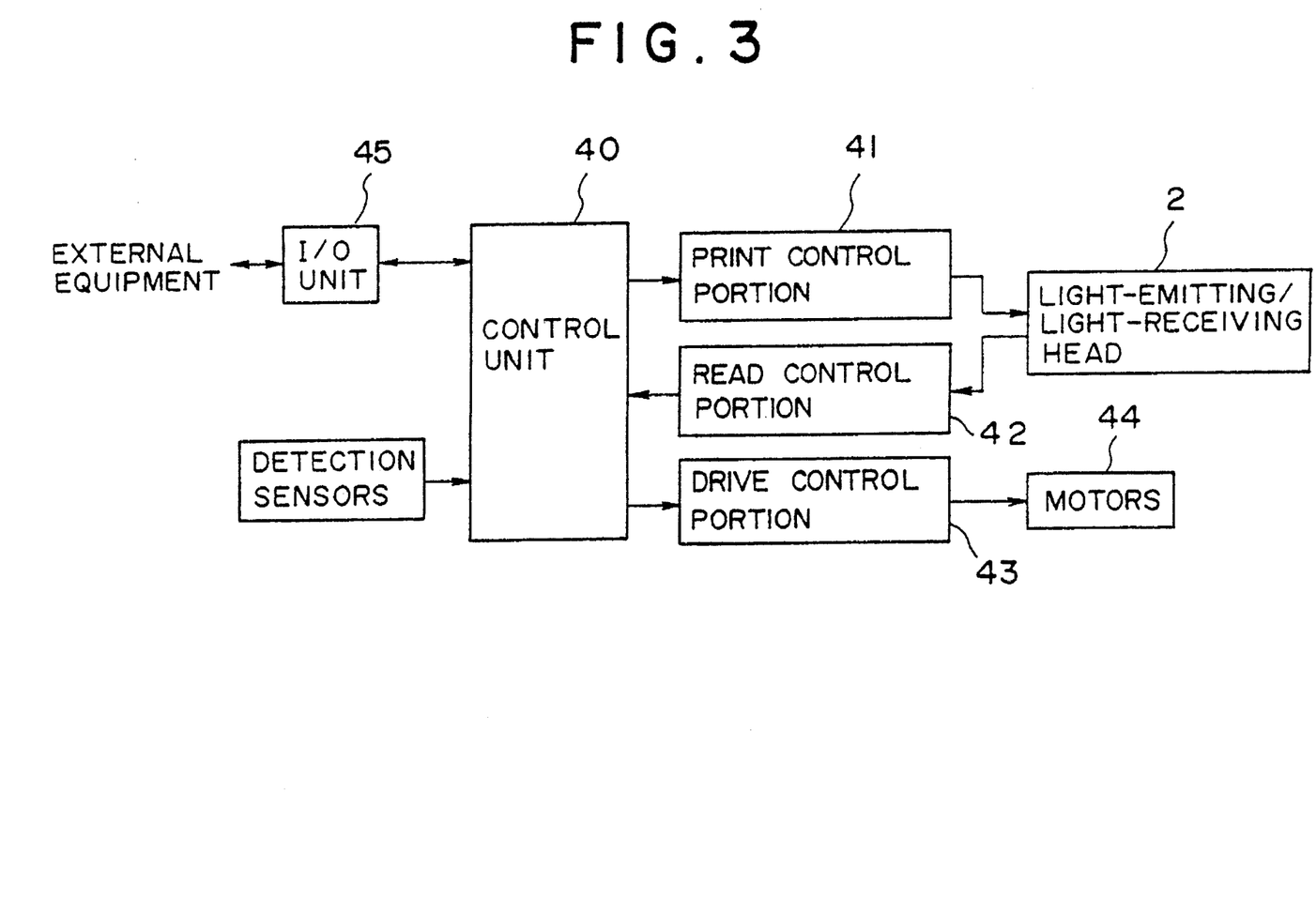
FIG. 3 is a block diagram of a control system in the scanner-equipped electrophotographic printing machine according to the first embodiment.

In FIG. 3, a control unit 40 is composed of a microcomputer or the like and controls the entire operation of the scanner-equipped electrophotographic printing machine. Various detection sensors are connected to the control unit 40. Based on detection signals from the various detection sensors, the control unit 40 ascertains the position of each printing paper sheet, the position of each original and the like and controls a print control portion 41, a read control portion 42, a drive control portion 43 and the like. Also connected to the control unit 40 is an input/output unit 45 which receives input signals from an external equipment and also transmits data read from each original. The control unit 40 also receives control signals, which have been inputted to the input/output unit 45 from the external equipment, and also print data and based on the control signals, controls writing of the print data on each printing paper sheet. Further, the control unit 40 also controls transmission of read data to the external equipment via the input/output unit 45.

The print control portion 41 processes print data from the input/output unit 45 and feeds the thus-processed data to the light-emitting and light-receiving head 2.

The read control portion 42 processes data read by the light-emitting and light-receiving head 2.

The drive control portion 43 controls various motors 44 and the like in the scanner-equipped electrophotographic printing machine so that various paper-and original-transporting rollers and the like for transporting each printing paper sheet and each original are driven.

Referring now to FIGS. 1, 2 and 3, a description will be made of an operation, as a printer, of the scanner-equipped electrophotographic printing machine according to the first embodiment of the present invention.

The print control portion 41 processes print data from the input/output unit 35 and transmits the thus-processed data to the light-emitting and light-receiving head 2. Based on the data so processed, the light-emitting and light-receiving head 2 causes its LED array to emit light. The light emitted by the LED array enters the half mirror 12 and is deflected by the half mirror 12 toward the first lens array 10. The light so deflected enters the first lens array 10 and is then converged to form a focal point on the surface of the drum-shaped photoreceptor 1, said surface having been charged by the primary charger 6. By the light converged by the first lens array 10, a dot image of a character, a pattern or the like is written as a latent electrostatic image on the surface of the drum-shaped photoreceptor 1. The drum-shaped photoreceptor 1 is rotated by one of the motor 44 under the control of the drive control portion 43 so that latent electrostatic images can be formed successively on the drum-shaped photoreceptor 1. The developer mechanism 3 begins to operate in accordance with a command from the drive control portion 43, whereby toner is attracted onto an area corresponding to the latent electrostatic image written on the surface of the drum-shaped photoreceptor 1. Pursuant to a command from the drive control portion 43, the transfer charger 4 applies a voltage so that the toner at the area corresponding to the latent electrostatic image formed on the surface of the drum-shaped photoreceptor 1 is transferred onto a printing paper sheet. In accordance with a command from the drive control portion 43, another one of the motors 44 is rotated to drive the paper-transporting rollers, so that the printing paper sheet onto which the toner is to be transferred is transported. Upon transfer, the printing paper sheet is transported to a position between the drum-shaped photoreceptor 1 and the transfer charger 4 owing to the provision of an unillustrated detection sensor. Subsequent to the transfer, the printing paper sheet is transported to the fixing unit 8. The fixing unit 8 heats under pressure the toner which has been transferred onto the printing paper sheet by the transfer charger 4, whereby the toner is fixed. After the fixing, the printing paper sheet is transported further and ejected to the outside of the machine. Any toner, which is still remaining on the surface of the drum-shaped photoreceptor 1 after the transfer, is cleaned off by the cleaning unit 5. Subsequent to the cleaning of the drum-shaped photoreceptor 1, the surface of the drum-shaped photoreceptor 1 is uniformly charged by the primary charger 6. The print control portion 41 repeats the above operation until no print data are inputted from the input/output unit 45. The control unit 40 controls the series of operations described above.

Referring again to FIGS. 1, 2 and 3, a description will next be made of an operation, as a scanner, of the scanner-equipped electrophotographic printing machine according to the first embodiment of the present invention.

The drive control portion 43 drives a further one of the motors 44 to rotate the original-transporting rollers, so that the original 15 is fed out of the original tray 9. As an alternative, the original-transporting rollers can be connected via unillustrated gears or the like to a paper-transporting motor (not shown). The original-transporting rollers can be rotated by the paper-transporting motor, whereby the original 15 can be fed out of the original tray 9. The original is once transported upwards in a vertical direction and is caused to pass in front of the second lens array 11. Before the original 15 reaches the second lens array 11, the fluorescent lamp 16 is turned on so that the original 15 is illuminated by the fluorescent lamp 16. The light illuminated onto the original 15 is reflected and the light so reflected enters the second lens array 11. The light so entered the second lens array 11 is converged and the light so converted enters the half mirror 12. The light so entered the half mirror 12 is allowed to transmit through the half mirror 12, whereby the light so transmitted is received in the LRD array of the light-emitting and light-receiving head 2. In this manner, the LRD array of the light-emitting and light-receiving head 2 can receive the light reflected by the original 15. The LRD array of the light-emitting and light-receiving head 2 can receive as an optical image each character, image or the like written, drawn or otherwise shown on the surface of the original 15, and can then convert it into electrical signals.

The read control portion 42 receives the electrical signals generated by the light-emitting and light-receiving head 2. The read control portion 42 processes the inputted electrical signals as read data. The control unit 40 can output the read data to the external equipment such as a personal computer via the input/output unit 45 or to a remote location through a modem. Further, the control unit 40 can also send the read data to the LED array of the light-emitting and light-receiving head 2 via the print control portion 41. Based on the print data delivered as described above, the light-emitting and light-receiving head 2 can form on the surface of the drum-shaped photoreceptor 1 a latent electrostatic image of the same pattern as the optical image written, drawn or otherwise shown on the original 15.

The scanner-equipped electrophotographic printing machine according to the first embodiment can therefore operate as both a printer and a scanner as described above.

Figure 4:
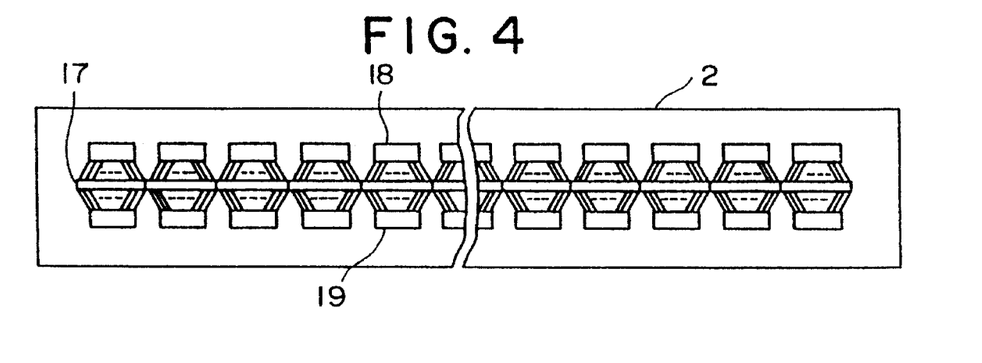
FIG. 4 is a plan view of a first example of the construction of a light-emitting and light-receiving head in a scanner-equipped electrophotographic printing machine according to the present invention.

Referring next to FIG. 4, a description will be made of the first example of the construction of the light-emitting and light-receiving head 2 in the scanner-equipped electrophotographic printing machine according to the first embodiment.

In FIG. 4, light-emitting diodes and light-receiving diodes are alternately arranged one by one to form an LED and LRD array unit 17 of the light-emitting and light-receiving head 2, respectively. An LED driver 18 is connected to the light-emitting diodes so that the light-emitting diodes are driven by the LED driver 18. A reading circuit 19 is connected to the light-receiving diodes so that an output from each light-receiving diode is read by the reading circuit 19.

The LED and LRD array unit 17 is generally in the form of a chip of several inches square. Accordingly, the light-emitting and light-receiving head 2 is formed by connecting LED and LRD array units 17 as many as needed depending on the printing width and the reading width. For example, the LED and LRD array unit 17 is in the form of a single chip which is composed of 64 light emitting diodes and 64 light receiving diodes. These light-emitting diodes and light-receiving diodes are arranged in such a way that eight light-emitting diodes and eight light-receiving diodes are alternated within a width of 1 mm. For the printing width of the B4 size, 32 chips of LED and LRD array units 17 are arranged linearly. The resolution is 8 lines/mm, which is sufficient for ordinary applications.

In the first example of the construction of the light-emitting and light-receiving head 2, the light-emitting diodes and the light-receiving diodes are arranged along a single line. The light-emitting and light-receiving head 2 can therefore be formed shorter in the direction of the circumference of the drum-shaped photoreceptor 1, thereby contributing to a dimensional reduction of the machine.

Figure 5:
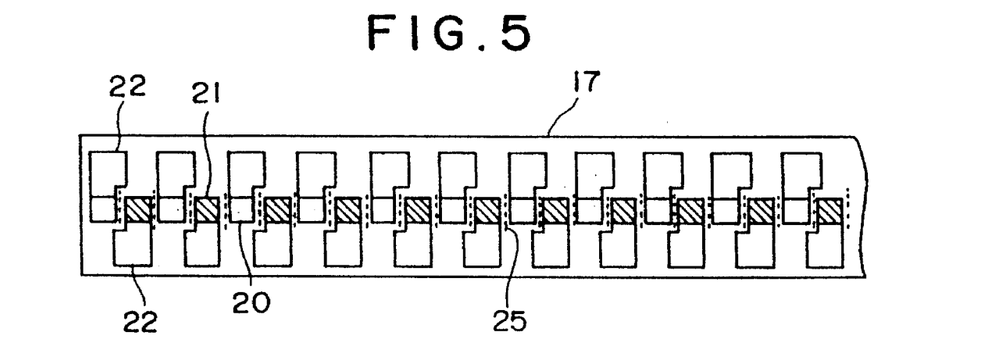
FIG. 5 is a plan view of a first example of the construction of an array of light-emitting and light-receiving devices in the scanner-equipped electrophotographic printing machine according to the present invention.

Reference is next had to FIG. 5. which is an enlarged fragmentary plan view of the LED and LRD array unit 17 employed in the scanner-equipped electrophotographic printing machine according to the present invention.

In FIG. 5, light-emitting diodes 20 and light-receiving diodes 21 are alternately arranged with a space left therebetween. The light-receiving diodes 21 are indicated by hatching to distinguish them from the light-emitting diodes 20. Each of the light-emitting diodes 20 and the light-receiving diodes 21, electrodes 22 are formed, for example, by vacuum-deposition of aluminum. The light-emitting diodes 20 and the light-receiving diodes 21 are positioned close to each other. Depending on the characteristics of the light-emitting diodes and the light-receiving diodes, light emitted from each light-emitting diode 20 may therefore directly enter its adjacent light-receiving diode 21. In such a case, it is desired to form a light-shielding ridge 25 between each light-emitting diode 20 and its adjacent light-receiving diode 21 so that light emitted from the light-emitting diode 20 is prevented from entering the adjacent light-receiving diode 21.

Figure 6:
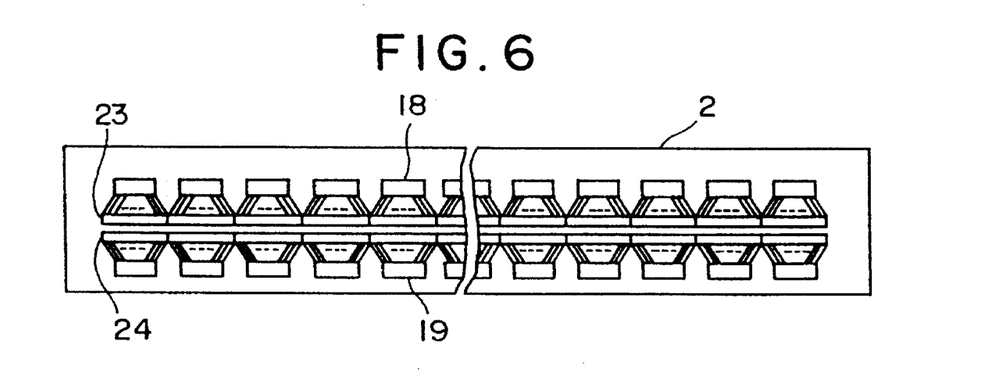
FIG. 6 is a plan view of a second example of the construction of the light-emitting and light-receiving head in the scanner-equipped electrophotographic printing machine according to the present invention.

Referring to FIG. 6, a description will next be made of the second example of the construction of the light-emitting and light-receiving head 2 in the scanner-equipped electrophotographic printing machine according to the first embodiment.

In FIG. 6, LED arrays 23 and LRD arrays 24 are fabricated as discrete chips. In the second example of the construction of the light-emitting and light-receiving head 2, the plural LED arrays 23 are arranged in series along a single line, and the plural LRD arrays 24 are also arranged in series along another single line. In the second example of the construction of the light-emitting and light-receiving head 2, the LED array 23 and the LRD arrays 24 can therefore be fabricated as discrete chips. This makes it possible to choose an optimal substrate as a base for each of the LED array 23 and the LRD arrays 24 and hence to facilitate the fabrication of the chips.

In the first embodiment, the fluorescent lamp 16 is used for the illumination of each original. The light source is however not limited to such a fluorescent lamp. For example, additional LEDs greater than the writing LEDs can be arranged in combination.

The scanner-equipped electrophotographic printing machine according to the second embodiment of the present invention will next be described with reference to FIG. 7.

Figure 7:
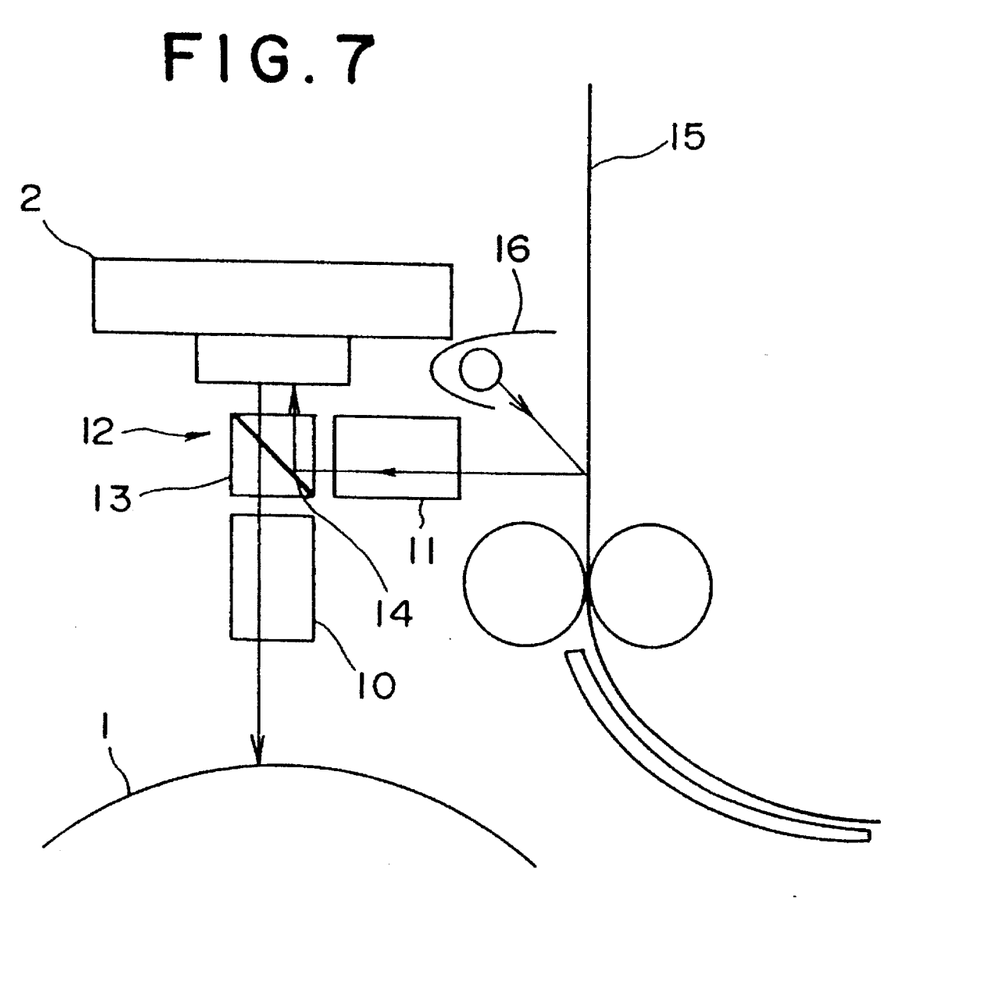
FIG. 7 is a plan view of a second example of the construction of the array of light-emitting and light-receiving devices in the scanner-equipped electrophotographic printing machine according to the present invention.

In FIG. 7, the light-emitting and light-receiving head 2 is located in a proximity of the half mirror 11 at a position turned over 90 degrees relative to its position in the first embodiment so that the light-emitting and light-receiving head 2 opposes the drum-shaped photoreceptor 1.

Referring to FIGS. 3 and 7, a description will be made of the operation, as a printer, of the scanner-equipped electrophotographic printing machine according to the second embodiment of the present invention. Description of the elements of construction, which are common to the first embodiment, is omitted herein.

The print control portion 41 processes print data from the input/output unit 45 and sends the thus-processed data to the light-emitting and light-receiving head 2. Based on the data so processed, the light-emitting and light-receiving unit 2 causes its LED array to emit light. The light emitted from the LED array enters the half mirror 12. The half mirror 12 transmits the entered light toward the first lens array 10. The transmitted light then enters the first lens array 10, whereby the transmitted light is converged by the first lens array 10 to form a focal point on the surface of the drum-shaped photoreceptor 1 which has been charged by the primary charger 6. By the light converged by the first lens array, a dot image of a character, a pattern or the like is written as a latent electrostatic image on the surface of the rotating drum-shaped photoreceptor 1.

Developing, transfer and fixing processes are then performed successively as in the first embodiment, so that the character, image or the like is printed on a printing paper sheet. The surface of the drum-shape photoreceptor 1 is cleaned after the transfer, thereby making the drum-shaped photoreceptor 1 ready for the next writing operation.

Referring again to FIGS. 3 and 7, a description will next be made of the operation, as a scanner, of the scanner-equipped electrophotographic printing machine according to the second embodiment of the present invention.

The drive control portion 43 drives the original transporting motor 44 to rotate the original transporting rollers to feed out the original 15 from the original tray 9. The original 15 is once transported upwards in a vertical direction and is caused to pass in front of the second lens array 11. Before the original 15 reaches the second lens array 11, the fluorescent lamp 16 is turned on so that the original 15 is illuminated by the fluorescent lamp 16. The light illuminated onto the original 15 is reflected and the light so reflected enters the second lens array 11. The light so entered the second lens array 11 is converged and the light so converted enters the half mirror 12. The light so entered the half mirror 12 is deflected toward the LRD array of the light-emitting and light-receiving head 2, and the light so deflected is received in the LRD array of the light-emitting and light-receiving head 2.

In this manner, the LRD array of the light-emitting and light-receiving head 2 can receive the light reflected by the original 15. The LRD array of the light-emitting and light-receiving head 2 can receive as an optical image each character, image or the like written, drawn or otherwise shown on the surface of the original 15, and can then convert it into electrical signals.

The second embodiment, like the first embodiment, can output the electrical signals, which have been generated from the light-emitting and light-receiving head 2, to the external equipment such as a personal computer via the input/output unit 45 or to a remote location through a modem. Further, the read data can also be sent to the LED array of the light-emitting and light-receiving head 2. Based on the print data delivered as described above, the light-emitting and light-receiving head 2 can form on the surface of the drum-shaped photoreceptor 1 a latent electrostatic image of the same pattern as the optical image written, drawn or otherwise shown on the original 15.

In the manner described above, both writing and reading can be performed while maintaining stationary the light-emitting and light-receiving head 2 and the optical system.

The second embodiment has been described using the fluorescent lamp 16 as a light source for illuminating each original 15. The fluorescent lamp 16 can however be omitted provided that light emitted by the light-emitting and light-receiving head 2 is used.

The light-emitting and light-receiving head 2 in the present invention can be an integral unit of an LED array for performing optical writing on the photoreceptor and an LRD array for reading each original. For example, the light-emitting and light-receiving head 2 can be a head assembly constructed of an integral unit of a writing/reading and original-illuminating LED array and the "SELFOC LENS". As an alternative, it can be a head assembly constructed of an integral unit of a writing and original-illuminating LED array, an original reading sensor and the "SELFOC LENS". To use an LED array for both writing and reading, it is only necessary to reverse the direction of a current to be applied to each LED upon reading relative to the direction of a current applied upon reading and then to detect any current change occurred in each illuminated LED.

Further, autoluminescent devices other than LEDs can also be used as light-emitting devices in the present invention.

What is claimed is:

1. A scanner-equipped electrophotographic printing machine comprising:

a stationary light-emitting and light-receiving unit for emitting light to perform writing on a light-sensitive writing device and for receiving light reflected from a document having information displayed thereon, the light-emitting and light-receiving unit, the light-sensitive device, and the document each having a width, the width of the light-emitting and light-receiving unit being at least as large as the width of the light-sensitive device and the width of the document;

stationary first means for guiding the emitted light and the received light, the first means forming a first optical path between the light-emitting and light-receiving unit and the light-sensitive writing device, and a second optical path between the document and the light-emitting and light-receiving unit; and stationary second means for focusing the light in the first and second optical paths, the second means comprising a first lens positioned in the first optical path between the first means and the light-sensitive writing device, and a second lens positioned in the second optical path between the document and the first means.

2. A scanner-equipped electrophotographic printing machine according to claim 1, wherein said light-emitting and light-receiving unit emits light for performing optical writing and light for illuminating the original and upon illumination of the original, light reflected by the original is caused to enter said light-emitting and light-receiving unit through said first means and said second means.

3. A scanner-equipped electrophotographic writing machine according to claim 1 further comprising a read/write control unit receiving externally supplied commands and providing read/write control signals, a write control portion for controlling writing according to the read/write control signals from the control unit, and a read control portion for controlling reading according to the read/write control signals from the control unit, the light-emitting and light-receiving unit receiving light reflected from the document, converting the light to read data, and outputting the read data to the read control portion, the read control portion providing the read data to the control unit, the control unit providing write data to the write control portion, the light-emitting and light-receiving unit inputting the write data from the write control portion, converting the write data to light, and emitting the light to perform writing on the light-sensitive writing device.

4. A scanner-equipped electrophotographic writing machine according to claim 3 operated as a copier, wherein the read data provided to the control unit by the read control portion is provided as the write data to the write control portion.

5. A scanner-equipped electrophotographic printing machine comprising:

a stationary generally elongate light-emitting unit for emitting light to perform writing on a light-sensitive writing device;

a stationary light source for illuminating a document having information displayed thereon;

a stationary generally elongate light-receiving unit for receiving light reflected from the document, the light-receiving unit being positioned generally parallel to and generally contiguous with the light-emitting unit, the light-emitting unit, the light-receiving unit, the light-sensitive device, and the document each having a width, the width of the light-emitting unit being at least as large as the width of the light-sensitive device and the width of the light-receiving unit being at least as large as the width of the document;

stationary means for guiding the emitted light and the received light, the guiding means forming a first optical path between the light-emitting unit and the light-sensitive writing device, and a second optical path between the document and the light-receiving unit, the first optical path having a deflecting turn and the second optical path being a generally straight line; and stationary means for focusing the light in the first and second optical paths, the focusing means comprising a first lens positioned in the first optical path between the guiding means and the light-sensitive writing device, and a second lens positioned in the second optical path between the document and the guiding means.

6. A scanner-equipped electrophotographic printing machine according to claim 5, wherein said machine is provided with a light-emitting and light-receiving head in which said light-emitting unit and said light-receiving unit are arranged close to each other.

7. A scanner-equipped electrophotographic printing machine according to claim 6, wherein said light-emitting and light-receiving head comprises light-emitting diodes and light-receiving diodes.

8. A scanner-equipped electrophotographic printing machine according to claim 7, wherein said light-emitting diodes and said light-receiving diodes are alternately arranged at least one by one to form a line.

9. A scanner-equipped electrophotographic printing machine according to claim 7, wherein at least two light-emitting diodes are arranged in series to form a line, at least two light-receiving diodes are arranged in series to form another line, and the line on which said light-emitting diodes are arranged and the line on which said light-receiving diodes are arranged are disposed in parallel with each other.

10. A scanner-equipped electrophotographic printing machine according to claim 7, further comprising a light-shielding ridge provided between each light-emitting diode and an adjacent light-receiving diode.

11. A scanner-equipped electrophotographic printing machine according to claim 5, wherein said light source comprises a fluorescent lamp or plural light-emitting diodes.

12. A scanner-equipped electrophotographic printing machine according to claim 5, wherein said guiding means comprises two triangular prisms combined together to present a rectangular shape in cross-section and a semitransparent film held between said two triangular prisms.

13. A scanner-equipped electrophotographic printing machine according to claim 5, wherein said focusing means comprising first means for focusing the light, which has been emitted by said light-emitting unit, onto said writing means and second means for focusing light, which has been reflected by said original, onto said light-receiving unit.

14. A scanner-equipped electrophotographic writing machine according to claim 3 further comprising a read/write control unit receiving externally supplied commands and providing read/write control signals, a write control portion for controlling writing according to the read/write control signals from the control unit, and a read control portion for controlling reading according to the read/write control signals from the control unit, the light-receiving unit receiving light reflected from the document, converting the light to read data, and outputting the read data to the read control portion, the read control portion providing the read data to the control unit, the control unit providing write data to the write control portion, the light-emitting unit inputting the write data from the write control portion, converting the write data to light, and emitting the light to perform writing on the light-sensitive writing device.

15. A scanner-equipped electrophotographic writing machine according to claim 14 operated as a copier, wherein the read data provided to the control unit by the read control portion is provided as the write data to the write control portion.

16. A scanner-equipped electrophotographic printing machine comprising:

a stationary generally elongate light-emitting unit for emitting light to perform writing on a light-sensitive writing device;

a stationary light source for illuminating a document having information displayed thereon;

a stationary generally elongate light-receiving unit for receiving light reflected from the document, the light-receiving unit being positioned generally parallel to and generally contiguous with the light-emitting unit, the light-emitting unit, the light-receiving unit, the light-sensitive device, and the document each having a width, the width of the light-emitting unit being at least as large as the width of the light-sensitive device and the width of the light-receiving unit being at least as large as the width of the document;

stationary means for guiding the emitted light and the received light, the guiding means forming a first optical path between the light-emitting unit and the light-sensitive writing device, and a second optical path between the document and the light-receiving unit, the second optical path having a deflecting turn and the first optical path being a generally straight line; and stationary means for focusing the light in the first and second optical paths, the focusing means comprising a first lens positioned in the first optical path between the guiding means and the light-sensitive writing device, and a second lens positioned in the second optical path between the document and the guiding means.

17. A scanner-equipped electrophotographic printing machine according to claim 16, wherein said machine is provided with a light-emitting and light-receiving head in which said light-emitting unit and said light-receiving unit are arranged close to each other.

18. A scanner-equipped electrophotographic printing machine according to claim 17, wherein said light-emitting and light-receiving head comprises light-emitting diodes and light-receiving diodes.

19. A scanner-equipped electrophotographic printing machine according to claim 18, wherein said light-emitting diodes and said light-receiving diodes are alternately arranged at least one by one to form a line.

20. A scanner-equipped electrophotographic printing machine according to claim 18, wherein at least two light-emitting diodes are arranged in series to form a line, at least two light-receiving diodes are arranged in series to form another line, and the line on which said light-emitting diodes are arranged and the line on which said light-receiving diodes are arranged are disposed in parallel with each other.

21. A scanner-equipped electrophotographic printing machine according to claim 18, further comprising a light-shielding ridge provided between each light-emitting diode and an adjacent light-receiving diode.

22. A scanner-equipped electrophotographic printing machine according to claim 16, wherein said light source comprises a fluorescent lamp or plural light-emitting diodes.

23. A scanner-equipped electrophotographic printing machine according to claim 16, wherein said guiding means comprises two triangular prisms combined together to present a rectangular shape in cross-section and a semitransparent film held between said two triangular prisms.

24. A scanner-equipped electrophotographic printing machine according to claim 16, wherein said focusing means comprising first means for focusing the light, which has been emitted by said light-emitting unit, onto said writing means and second means for focusing light, which has been reflected by said original, onto said light-receiving unit.

25. A scanner-equipped electrophotographic writing machine according to claim 12 further comprising a read/write control unit receiving externally supplied commands and providing read/write control signals, a write control portion for controlling writing according to the read/write control signals from the control unit, and a read control portion for controlling reading according to the read/write control signals from the control unit, the light-receiving unit receiving light reflected from the document, converting the light to read data, and outputting the read data to the read control portion, the read control portion providing the read data to the control unit, the control unit providing write data to the write control portion, the light-emitting unit inputting the write data from the write control portion, converting the write data to light, and emitting the light to perform writing on the light-sensitive writing device.

26. A scanner-equipped electrophotographic writing machine according to claim 25 operated as a copier, wherein the read data provided to the control unit by the read control portion is provided as the write data to the write control portion.

* * * * *